Dec. 18, 1956 G. MUFFLY 2,774,223
ICE MAKING METHOD AND APPARATUS
Filed July 20, 1950
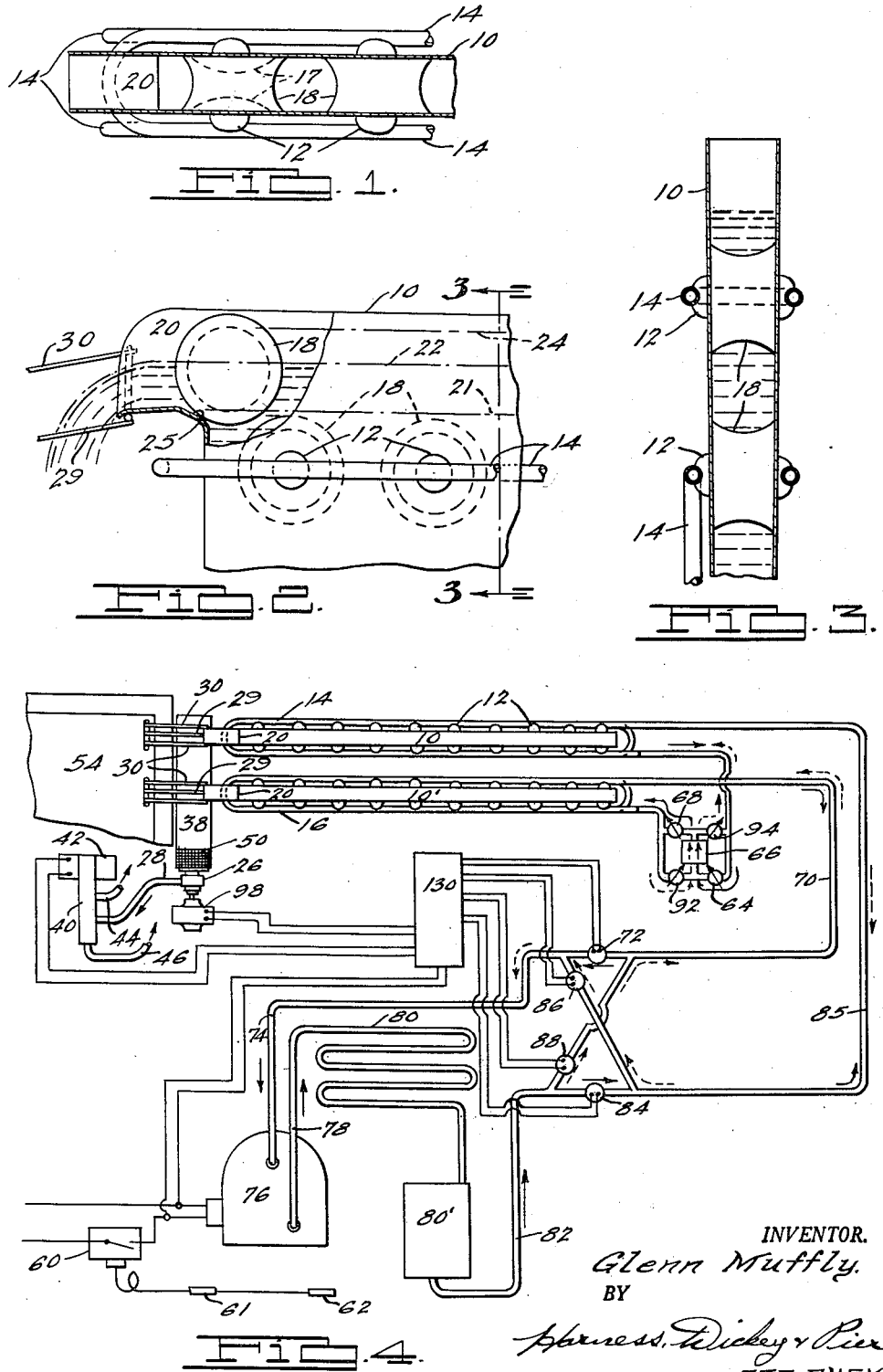
INVENTOR.
Glenn Muffly.
BY
Harness, Dickey & Pierce.
ATTORNEYS.

United States Patent Office 2,774,223
Patented Dec. 18, 1956

2,774,223

ICE MAKING METHOD AND APPARATUS

Glenn Muffly, Springfield, Ohio

Application July 20, 1950, Serial No. 174,944

15 Claims. (Cl. 62—7)

This invention pertains to automatic ice making methods and is applicable to household refrigerators and commercial and industrial ice makers for various uses as disclosed in previous U. S. patents and applications of mine. Among my recent patent applications reference is made in particular to U. S. applications Serial Number 50,101 filed September 20, 1948, now Patent Number 2,672,016, issued March 16, 1954, Serial Number 109,942 filed August 12, 1949, now Patent Number 2,672,017 issued March 16, 1954, Serial Number 178,498 filed August 9, 1950, and to Canadian application Serial Number 588,997 filed June 13, 1949.

The general method of freezing ice on a wetted surface and then heating the surface to release the ice to float in water or to fall by gravity is first shown in my U. S. patent application which resulted in Patent No. 2,145,773 issued January 31, 1939, and co-pending applications which issued as Patent Numbers 2,145,774, 2,145,775 and 2,145,777 on the same day. In all of these and in other applications of mine ice has been frozen in separate masses and if these masses joined each other due to prolongation of the freezing period such junctions were at relatively thin sections of the ice masses, allowing them to break apart readily.

Some of my earlier applications disclosed the ideas of freezing a ring or hollow cone of ice within or on the outer surface of a tube or cup and of freezing slabs or disks of ice on a flat surface of which only certain restricted areas were refrigerated. Other disclosures of mine showed ice frozen within separate molds or cups formed in the bottom or on the side walls of a tank.

Experience in the marketing of ice makers produced under licenses which I have granted developed the following forms of sales resistance to designs thus far offered on the market:

(a) Ice made in solid form in molds or cups, while best received as to the size and shape of the ice, is made in machines which are essentially difficult to wash because of the shapes of the molds. Also the molds, when upright in position, can not be readily drained of water.

(b) Ice made in the ring or hollow cone form is objected to because of the hole in the ice, which causes it to displace less liquid and to melt away more rapidly. Machines for making this form of ice are further objected to on the basis of being hard to keep clean and sanitary.

(c) Ice made on flat surfaces is objected to on the ground that it is thin in one dimension, which also causes it to melt away rapidly.

The demand is for a piece of ice which has a thick section and is of such size and shape as to provide a good weight of ice without presenting a large surface area for meltage. At the same time the demand is for clear ice. The ideal shape to fit a drinking glass is a round disk, flat on two sides, with enough thickness to provide the desired weight of an ounce or more per piece and yet not so thick as to become a bar of ice instead of a disk. The disk will float flat in the glass and is less objectionable to the drinker than a cube, bar or irregular piece which interferes with drinking.

In my search for a method of making ice in the preferred form without the use of molds or tubes, to which objections are raised as mentioned above under *a* and *b*, I have found a solution in the use of pairs of opposed surfaces, preferably flat, both of which are refrigerated at the same time, thus first forming two rather thin flat disks. As the freezing process continues these flat disks grow to contact each other at their thicker sections and join to form a thick disk or wedge-shaped piece of ice.

The main object of this invention is to provide a method for making the desired thick pieces of ice on easily cleaned surfaces.

A further object is to cause two relatively thin pieces of ice to freeze together while still forming, thus producing a single thicker piece of ice.

An additional object is to produce ice in round form to fit a drinking glass.

A still further object is to utilize the round shape of the ice to cause it to roll out of the tank in which it is produced instead of requiring that water flow from the tank be of such volume as to float it out.

Another object is to provide an ice-making tank having one relatively small horizontal dimension and producing therein pieces of ice with flat sides and a thickness nearly as great as said dimension so that one entire side of the tank may be left open for the ice pieces to be pushed out by the head of water which accumulates back of the ice as it approaches and substantially blocks the open side of the tank.

A still further object is to make ice in a form which floats flat in a glass of water or other drink and yet has enough thickness to prevent it from melting too rapidly.

These and other objects will appear from the drawing, the following specification and the appended claims.

In the drawings:

Fig. 1 is a top plan view showing one end of the ice-making tank and its evaporator.

Fig. 2 is a side view of a portion of the same tank, showing the outlet for ice and water in section.

Fig. 3 is a vertical sectional view taken on the line 3—3 of Fig. 2.

Fig. 4 is a plan and diagrammatic view of an ice-maker and its refrigerating system, showing a pair of ice-making tanks such as the one shown in previous views.

Referring to Fig. 1 we see a plan view of the ice-making tank 10 on the side walls of which directly opposed areas are cooled by the buttons 12 which contact or are soldered to the outside of the tank in directly aligned pairs. These buttons are in turn soldered to the evaporator tube 14 (or 16 of Fig. 4) which supplies the cooling effect to the buttons and thereby to the interior areas of the tank on each of which a disk of ice 17 is formed. The two opposed disks 17 grow in size as the freezing progresses, finally joining and continuing to freeze until each pair of ice disks 17 forms one thick disk of ice 18.

After these thick disks 18 have been completely formed and before adjacent pieces 18 join each other the refrigeration of evaporator 14 is discontinued and the ice pieces 18 are released from the walls of tank 10 by one of the methods disclosed in my earlier patent applications above mentioned, whereupon the released ice disks float upwardly or drop downwardly, depending upon whether the tank 10 is filled with water or water is trickled downwardly within it. In the accompanying drawings I have shown the tank 10 as filled with water, hence the released ice will float upwardly. Since water is supplied to the tank 10 at a sufficient rate to wash the ice surfaces during the freezing process it will overflow through the open upper end 20, where the idle water level 21 is raised by inflow of water to the tank such as to maintain the operating level 22 of water. This water flows into a suitable overflow tank and is returned by a pump to the tank 10 as shown in my various copending applications and particularly in U. S. application Serial No. 50,101.

As a released piece of ice 18 approaches the overflow side 20 of the tank 10 it substantially blocks overflow of water until the level 22 of water in the tank 10 rises to a higher level such as 24, thus causing the ice to roll up the incline 25 impelled by the push of water supplied by pump 26 through tube 28 (Fig. 4). The ice rolls out onto the wire or wires 29 upon which it rolls to a suitable ice storage bin while guided by at least two side wires 30. The water falls past the wire or wires 29 into a second tank which feeds the pump (26 in Fig. 4), thus being separated from the ice. The wires 29 and 30 are so spaced that any partially formed pieces of ice, such as 17, which may accidentally be released, will fall with the water into the second tank or sump, where they will melt and aid in cooling the water. A screen protecting the inlet of the water pump prevents such ice or floating ice crystals from clogging the pump inlet.

Figure 2 is a side elevation showing the same portion of tank 10 as seen in Fig. 1. Fig. 3 is a vertical section of Fig. 2 showing two of the completed pieces of ice 18 prior to their release and indicating the slight taper between side walls of the tank. This taper allows extra clearance as the released ice floats upwardly. In the event that ice is to be dropped instead of floated the taper is in the opposite direction and the tank is provided with a bottom opening for passage of ice and water to the device for separating ice from the water. In this case the water supply is pumped to a suitable spray or distributor at the top of the tank for wetting its interior side walls as the water trickles downwardly to the outlet. If this outlet is the full size of the tank bottom we might refer to the tank as a vertical flue or flat duct.

In either case the side walls are refrigerated at separate areas and are formed of relatively thin sheet material, preferably one having a relatively low thermal conductivity. Stainless steel has been found to serve admirably as these side walls. It is important that the refrigerated spots be so spaced as to avoid formation of a complete band of ice around the interior of the tank or flue, as space must be allowed for flow of water over the exterior surfaces of the solid pieces of ice which are formed without any hole for water flow.

The cost of the flat tank or flue and its evaporator is less than that of a series of separate tubes and their cooling coils for refrigerating them all the way around to form rings or tubes of ice.

Fig. 4 shows a pair of identical ice-making tanks 10 and 10' with their evaporators 14 and 16 connected in a complete system similar to the one illustrated by Fig. 2 of my co-pending U. S. application Serial No. 109,942. For convenience in comparing with this earlier disclosure I have identified many of the parts of Fig. 4 with the same reference numerals seen in Fig. 2 of this earlier application. Reference is made to this and other of my earlier applications for details which are not fully explained in the present application.

The overflow tank 38 (Fig. 4) represents the equivalent tank of the same number in my application Serial No. 109,942. Water drawn from this tank by the pump 26 is delivered through tube 28 to a valve 40 which is actuated by the solenoid 42 to divert water from outlet tube 44 to tube 46. Thus when the solenoid is not energized water is delivered through tube 44 to tank 10 and when the solenoid is energized the water is delivered from the pump to tube 46 and thence to a lower portion of tank 10'. In either case the water in tank 38 passes through screen 50 to the inlet of pump 26, thus stopping any ice crystals or small pieces of ice in tank 38 to prevent clogging of the pump inlet.

The ice storage bunker 54 is arranged to receive ice from the track formed by wires 29 and 30 after its separation from the water which flows into tank 38. The ice bunker 54 is preferably insulated but not refrigerated except by the ice which it contains. This insures against sub-cooling of the stored ice which might cause the separate pieces to freeze together.

Stopping and starting of the system is controlled by switch 60 with which one or more bulbs 61 and 62 are connected. This switch is thermostatically actuated by the vapor pressure of a volatile fluid in the usual manner, but the charge of volatile fluid is such that its liquid portion will always fill one of the bulbs and partially fill the second bulb, hence its response is to the temperature of the partially filled bulb. One of the bulbs is located within the ice bunker 54, as shown by previous applications of mine, to stop the system when the ice bunker is filled to the desired level. The second bulb is located at a point which is normally warmer than the cut-out temperature of switch 60, hence the bulb in the ice bunker remains full of liquid and the switch 60 remains closed. At the time of the shift from one to the other of evaporators 14 and 16 there is a "flash-back" which cools the suction line to a lower point than usual, causing the bulb associated with it to be filled with liquid so that the bulb in the ice bunker is only partly full of liquid and therefore takes over its control function. The result is that switch 60 always opens just after a switch from one evaporator to the other and before any appreciable amount of ice has been formed by the evaporator which is becoming active. This insures that stoppage in response to a full bunker of ice occurs between cycles instead of in the middle of an ice-making period and avoids the delivery of half-formed pieces of ice to storage. This feature is disclosed in my U. S. patent application Serial No. 50,101 filed September 20, 1948.

The balance of the system seen in Fig. 4 is briefly described as follows, reference being made to co-pending application Serial No. 109,942 for further details. The sealed motor-compressor unit 76 delivers compressed refrigerant vapor through tube 78 to the condenser 80 and liquid is collected in receiver 80' from which it flows through tube 82, the open valve 84 and tube 85 to coil 14 which is thereby heated to release ice previously frozen in tank 10. The liquid, now further cooled, flows through check valve 64, expansion valve 66 and check valve 68 to evaporator 16 which is active in producing ice in tank 10'. Vapor leaves evaporator 16 through tube 70 and open valve 72 to return to the compressor through suction tube 74. The solenoid valves 86 and 88 and check valves 92 and 94 remain closed during the above portion of the cycle. The pump motor 98 is operating whenever ice is being frozen in either tank and may or may not stop briefly at the time of the switch from one to the other of the ice-making evaporators. If such stoppage is desired it is provided by the clock-motor-driven switch 130 which includes a motor connected in parallel with the motor of 76 and controlled by the same switch 60.

The switch mechanism 130 times the opening and closing of circuits which actuate the various solenoids of valves 40, 72, 84, 86 and 88 and may if desired control the motor 98. The various valves operate to effect the reversal of flow to stop freezing ice in one tank and start freezing in the other while heating the previously active evaporator to effect release of ice from its associated tank wall areas.

The first step in this exchange of evaporator functions following the portion of the cycle above described is that the switch mechanism 130 breaks the circuit to valve 84, thus allowing it to close and so stopping the flow of liquid refrigerant which now accumulates in receiver 80' while liquid continues to flow from evaporator 14 through expansion valve 66 to the active evaporator 16. After most of the liquid has been thus drained from evaporator 14 the valve 72 closes and valve 86 opens so that the compressor now draws vapor from evaporator 14 instead of from 16. Immediately thereafter valve 88 is opened by switch 130 to allow the liquid refrigerant accumulated in 80' to flow into evaporator 16 and start releasing the ice in tank 10'. At the end of the desired freezing period as timed by 130 the valves are actuated to pump out evaporator 16 and again start making ice in tank or flue 10.

The valve 40 directs flow of water from tube 28 to either tube 44, leading to tank 10, or to tube 46, which leads to tank 10'. Water is supplied to the tank in which ice is being formed. Water flow is diverted to the other tank in time to push the released ice from it before the refrigerant flow reversal has time to refreeze floating ice to the tank walls.

Many variations of this system and its control are shown in my issued patents and co-pending applications. Any of them may be used in connection with the present invention which resides mainly in the features of Figs. 1, 2 and 3.

I claim:

1. The method of forming a plurality of relatively thick pieces of ice between adjacent wetted surfaces facing each other by cooling a plurality of small areas of each of said surfaces to form separate pieces of ice thereon, causing water to flow over the ice while forming on said cooled areas, continuing said cooling until the pieces of ice which have formed on a pair of opposed areas have increased in thickness until they have made contact with each other and frozen together at thicker sections of each piece to form a double-thickness solid piece of ice, and then releasing the last said piece of ice from said surfaces.

2. The method of freezing a plurality of pieces of ice on each of a pair of wetted opposed flat surfaces having a space between them and continuing said freezing until opposed pieces of ice join each other at a thicker section of each piece and bridge said space, thus forming a plurality of double-thickness pieces of ice between said pair of surfaces, and then releasing said double-thickness pieces of ice from said surfaces.

3. An article of manufacture formed entirely of ice in the form of a disk having two flat sides and a circumferential groove in its peripheral face.

4. In an ice-making apparatus, means forming a pair of surfaces arranged to face each other, means for refrigerating a plurality of small areas of each of said surfaces to cause ice to form on said areas, said areas being arranged in pairs of which an area on one surface is matched by an opposed area on the other of said surfaces, means for causing water to flow between said surfaces to wet said areas and the ice formed thereon with water in motion, means for stopping the refrigeration of said areas after the pieces of ice on an opposed pair thereof have joined at thickened sections of each piece to form a double-thickness piece of ice, means for causing said double-thickness piece of ice to be released from both of said areas, and a source of energy for actuating the last two said means.

5. In an ice-making apparatus as defined in claim 4, control means for regulating the length of an ice freezing period to control the size of the double thickness pieces of ice, and means for adjusting said control to shorten the freezing period so that the two thin pieces of ice are released prior to their joining together.

6. In an ice-making apparatus, a flat vertical enclosure having one small and one relatively large horizontal dimension, means for refrigerating a plurality of pairs of aligned spots on the side walls of said enclosure, each said pair including a spot on each of the two larger side walls of said enclosure, means for wetting the interior of said enclosure with water in motion, means for discontinuing the refrigeration of said spots after a pair thereof have each accumulated a mass of ice and said masses on the pair have joined at their thicker sections to form one larger mass of ice, means for causing said larger mass to be released from said pair of spots, and control means for regulating the ice freezing and ice releasing periods to produce a quantity of said larger masses of ice.

7. In an ice maker of the flotation type, a tank having two flat sides slightly farther apart at the top of the tank than at a lower portion thereof, means for freezing therein solid pieces of ice having their opposite surfaces frozen to opposite sides of said tank, means for releasing said ice to allow it to float upwardly in said tank, one end wall of said tank stopping short of the top of the tank, means for feeding water to said tank to cause it to overflow said end wall, said pieces of ice being adapted to retard the overflow of said water as they float into proximity with the tank end where water is overflowing thus causing the water level in said tank to be raised by the incoming water until the ice is pushed out of the tank by the increased head of water within the tank, and means outside of the tank for separating the ice from the overflowing water.

8. In an ice-making machine, means forming a pair of surfaces facing each other, said surfaces being wetted by circulating water, means for refrigerating said surfaces to freeze a plurality of separate pieces of ice on each surface, and a control device for stopping said freezing at a selected stage in the growth of said ice, one such stage being after two separate pieces of ice one formed on each of said pair of surfaces have joined to form one symmetrical piece of ice of greater thickness than either of said separate pieces.

9. The process of forming two relatively thin disks of ice on adjacent surfaces facing each other, continuing the formation of said disks until they grow in thickness to join each other at central portions of each and form one thicker symmetrical disk of ice having a circumferential groove in its newly formed surface which is in contact with unfrozen water, releasing said thicker disk of ice from the surfaces on which it has been frozen, and causing said thicker disk to roll away from contact with unfrozen water.

10. In an ice-making machine, two approximately parallel adjacently located sheets of metal, a refrigerating system including evaporator means embracing said sheets and in heat transfer relationship with them on their remote sides at a plurality of separated spots on each sheet for the purpose of cooling pairs of aligned spots, means for wetting the adjacent sides of said sheets to cause thin flakes of ice to form on each sheet in alignment with flakes of ice forming on the other sheet, and control apparatus for regulating the length of periods during which said spots are cooled and thereby providing two types of cyclic operation in one of which the cooling periods are short and the flakes of ice are allowed to thaw free from said sheets while quite thin and in the other the cooling periods are of sufficient length to cause each flake to grow until it joins its aligned flake on the other sheet to produce a cake of ice as thick as the distance between said sheets and then stop the cooling of said spots to allow the ice to melt free from said sheets.

11. The method of forming spool-shaped pieces of ice by cooling a plurality of small spots on each of a pair of spaced surfaces facing each other while said surfaces are wetted by water in motion, continuing said cooling until ice disks form on said spots and grow to join opposed ice disks at a thicker section of each disk, and then causing the resultant double-thickness pieces of ice to melt free from said surfaces.

12. The method of making a piece of ice having two opposite sides formed by contact with small refrigerated spots on two relatively large surfaces which consists of flowing water between said surfaces while refrigerating said spots until separate pieces of ice are formed on said spots and join each other at a middle area of each piece to form a double-thickness piece of ice, and then heating said spots to release the ice.

13. The method of forming a solid spool-shaped piece of ice by cooling only relatively small aligned areas, one on each of two surfaces facing each other, and continuing this cooling until a small disk of ice forms on each of said areas while said surfaces and ice are wetted by liquid to be frozen, continuing said cooling and wetting until each said disk increases to a greater thickness at its middle portion than near its edges whereby the disks first join near their middles to form the desired spool-shaped piece of ice and the area of said piece of ice frozen on each said surface has become greater than that of the disk of ice first formed on said surface and yet substantially smaller than the area of said surface, the resulting piece of ice having its thickness established by the distance between said surfaces and its diameter established by the extent of said cooled areas, their temperature, thermal conductivity and the duration of the freezing period, said ice being then released from said surfaces, leaving the surfaces clear for the freezing of additional ice thereon.

14. The method of forming a solid disk of clear ice having two substantially flat and substantially parallel faces separated by a peripheral groove extending entirely around its edge by application of refrigeration to opposed central areas of surfaces on which ice is formed while water is circulated over said ice until separate opposed pieces of ice join and then flowing water around the point of juncture.

15. The method of building up a piece of ice by first freezing two small pieces on opposed surfaces and continuing to cool central portions only of said surfaces until said pieces join, then continuing said cooling while flowing water around their area of junction.

References Cited in the file of this patent
UNITED STATES PATENTS

| | | |
|---|---|---|
| 1,923,522 | Whitehouse | Aug. 22, 1933 |
| 2,099,665 | Smith | Nov. 16, 1937 |
| 2,133,521 | Wussow | Oct. 18, 1938 |
| 2,145,773 | Muffly | Jan. 31, 1939 |
| 2,247,017 | Henning | June 24, 1941 |
| 2,299,414 | Spiegel | Oct. 20, 1942 |
| 2,334,941 | Limden | Nov. 23, 1943 |
| 2,349,451 | Motz | May 23, 1944 |
| 2,405,272 | Smith | Aug. 6, 1946 |
| 2,435,285 | Lucia | Feb. 3, 1948 |
| 2,471,655 | Rundell | May 31, 1949 |
| 2,491,837 | Smith-Johannsen | Dec. 20, 1949 |
| 2,496,304 | Muffly | Feb. 7, 1950 |
| 2,522,506 | Field | Sept. 19, 1950 |
| 2,524,815 | Leeson | Oct. 10, 1950 |
| 2,540,343 | Muffly | Feb. 6, 1951 |
| 2,549,747 | Leeson | Apr. 17, 1951 |
| 2,571,506 | Watt | Oct. 16, 1951 |
| 2,593,874 | Grandia | Apr. 22, 1952 |
| 2,595,588 | Lee | May 6, 1952 |

FOREIGN PATENTS

| | | |
|---|---|---|
| 15,523 | Great Britain | 1897 |